(12) United States Patent
Seki

(10) Patent No.: US 10,882,026 B2
(45) Date of Patent: Jan. 5, 2021

(54) PROCESS FOR PRODUCING CHLORINE

(75) Inventor: Kohei Seki, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 277 days.

(21) Appl. No.: 13/060,318

(22) PCT Filed: Aug. 28, 2009

(86) PCT No.: PCT/JP2009/065449
§ 371 (c)(1),
(2), (4) Date: Feb. 23, 2011

(87) PCT Pub. No.: WO2010/024461
PCT Pub. Date: Mar. 4, 2010

(65) Prior Publication Data
US 2011/0158897 A1    Jun. 30, 2011

(30) Foreign Application Priority Data
Aug. 28, 2008 (JP) ................. 2008-219188

(51) Int. Cl.
C01B 7/04 (2006.01)
B01J 23/46 (2006.01)
B01J 35/10 (2006.01)

(52) U.S. Cl.
CPC ............ B01J 23/462 (2013.01); B01J 35/10 (2013.01); C01B 7/04 (2013.01); Y02P 20/20 (2015.11)

(58) Field of Classification Search
CPC ............ C01B 7/04; B01J 23/462; B01J 35/10
USPC ........................ 423/500, 502, 507
See application file for complete search history.

(56) References Cited

U.S. PATENT DOCUMENTS

| | | | | |
|---|---|---|---|---|
| 3,758,625 | A * | 9/1973 | Cohen ................. | C07C 5/46 585/433 |
| 3,760,067 | A * | 9/1973 | Ingwalson .......... | B01J 27/1817 423/502 |
| 3,846,337 | A * | 11/1974 | Young ................. | B01J 20/10 502/65 |
| 6,962,682 | B2 * | 11/2005 | Walsdorff et al. ........ | 423/502 |
| 6,977,066 | B1 * | 12/2005 | Iwanaga ............... | C01B 7/04 423/502 |
| 2002/0028173 | A1 * | 3/2002 | Hibi et al. ............. | 423/502 |
| 2004/0115119 | A1 * | 6/2004 | Olbert et al. ........... | 423/502 |
| 2007/0274901 | A1 * | 11/2007 | Wolf et al. ............. | 423/502 |
| 2010/0196255 | A1 * | 8/2010 | Horiuchi et al. ......... | 423/502 |

FOREIGN PATENT DOCUMENTS

| | | |
|---|---|---|
| EP | 1 894 885 A1 | 3/2008 |
| JP | 09-118503 A | 5/1997 |
| JP | 09-142806 A | 6/1997 |
| JP | 2000-281314 A | 10/2000 |
| JP | 2001-199710 A | 7/2001 |
| JP | 2006-219325 A | 8/2006 |
| WO | 2004/052777 A1 | 6/2004 |

OTHER PUBLICATIONS

"Define the variables", 2007, taken from https://web.archive.org/web/20070502004524/http://www2.lv.psu.edu/jxm57/irp/var.htm.*
Remachandran, P.A. "ChE 512: Topic 2, Reactions in a porous catalyst", 2009, taken from http://classes.engineering.wustl.edu/2009/spring/che512/ChE512_part2_L3.pdf, 24 pages.*
Dogu, Timur, "Diffusion and Reaction in Catalyst Pellets with Bidiperse Pore Size Distribution", Ing. Eng. Chem. Res. 1998, 37, pp. 2158-2171.*
First Office Action dated Jan. 16, 2013 in Chinese Patent Application No. 200980142992.9 to Sumitomo Chemical Co., Ltd., with translation.
European Search Report dated May 26, 2014 issued in European counterpart Application No. 09810101.7.
Second Office Action dated Oct. 10, 2013, in counterpart Chinese Patent Application No. 200980142992.9 with English translation.
Andrey Jensa et al., "Development of Information System for Extrusion Forming Process of Catalyst Pastes," European Symposium on Computer Aided Process Engineering-15 (2005).
Iwanaga et al., The Development of Improved Hydrogen Chloride Oxidation Process, translation from R&D Report "Sumitomo Kagaku", vol. 2004-I; 11 pages total.
Communication dated Jun. 11, 2018 from the European Patent Office in counterpart Application No. 09 810 101.7.

* cited by examiner

Primary Examiner — Ngoc-Yen Nguyen
(74) Attorney, Agent, or Firm — Sughrue Mion, PLLC

(57) ABSTRACT

There is disclosed a process for producing chlorine by feeding hydrogen chloride and oxygen into catalyst beds which are formed in the reaction tubes of a fixed-bed multitubular reactor and which contain catalysts for use in oxidation of hydrogen chloride, and this process is characterized in that the catalyst beds in one reaction zone in the fixed-bed multitubular reactor are catalyst beds formed by packing catalysts of a plurality of production lots; and in that the catalysts of the plurality of production lots satisfy the following condition (I): Condition (I): a value of AB is smaller than 1.20 (with the proviso that A and B are values of three significant figures, having a relationship of A≥B), wherein the pore volume of a catalyst of one production lot optionally selected from the plurality of production lots is A [ml/g], and the pore volume of another one production lot is B [ml/g].

20 Claims, No Drawings

PROCESS FOR PRODUCING CHLORINE

CROSS REFERENCE TO RELATED APPLICATION

This application is a National Stage of International Application No. PCT/JP2009/065449 filed Aug. 28, 2009, claiming priority based on Japanese Patent Application No. 2008-219188 filed Aug. 28, 2008, the contents of all of which are incorporated herein by reference in their entirety.

TECHNICAL FIELD

The present invention relates to a process for producing chlorine by oxidizing hydrogen chloride in a fixed-bed multitubular reactor.

BACKGROUND ART

Chlorine is useful as a raw material for vinyl chloride, phosgene, etc., and chlorine can be obtained by oxidizing hydrogen chloride in the presence of a catalyst. As a process for producing chlorine, there is known, for example, a process by the use of so-called fixed-bed reaction system wherein hydrogen chloride and oxygen are allowed to pass through a catalyst bed which is formed by packing a reaction tube with a catalyst for use in production of chlorine (cf., Patent Publications 1 and 2).
Patent Publication 1: JP-A-2000-281314
Patent Publication 2: JP-A-2001-199710

DISCLOSURE OF THE INVENTION

In case where hydrogen chloride is oxidized on an industrial scale by a fixed-bed reaction system, a fixed-bed multitubular reactor which has several thousands to several tens of thousands of reaction tubes is generally used. In this oxidation reaction, a large amount of a catalyst for use in production of chlorine is needed to form catalyst beds in all of these reaction tubes. This oxidation reaction of hydrogen chloride is an exothermic reaction of 59 kJ/mol for chlorine, and therefore, formation of hot spots in the catalyst beds is facilitated in case of the fixed-bed reaction system. For example, in case where catalysts of production lots different from one another are used for catalyst beds in a number of reaction tubes, the temperatures of hot spots in these reaction tubes may vary, even if these reaction tubes are left to stand under the same temperature control. Such a variation in temperature would be overcome by temperature control (e.g., setting of a temperature of a heating medium) made using as a reference a temperature of a reaction tube including a catalyst bed with a higher hot spot. This temperature control, however, leads to a disadvantage that a sufficient conversion can not be obtained in a reaction tube including a catalyst bed with a hot spot lower than the above reference temperature. On the contrary, temperature control made using as a reference a temperature of a reaction tube including a catalyst bed with a lower hot spot, however, tends to lead to a disadvantage that a reaction temperature in a reaction tube including a catalyst bed with a hot spot higher than the above reference temperature becomes too high, which may lead to runaway of the reaction.

The present invention is therefore intended to provide a process for stably producing chlorine, by an oxidation reaction of hydrogen chloride on an industrial scale with the use of a large amount of catalysts in a fixed-bed multitubular reactor, while suppressing variation in temperatures of hot spots in catalyst beds in a plurality of reaction tubes in one reaction zone.

As a result of the present inventor's intensive studies in order to solve the above-described problem, such variation in temperatures of hot spots in the catalyst beds is found to be attributed to difference in physical properties of catalysts packed in the respective reaction tubes, and particularly a pore volume out of the respective physical properties is found to give a considerable influence on the temperatures of hot spots which are formed during the oxidation reaction of hydrogen chloride. Then, it is found that, when a catalyst having a specified pore volume is selected and used as a catalyst to be packed in reaction tubes so as to form catalyst beds therein in a certain one reaction zone of a fixed-bed multitubular reactor, variation in temperatures of hot spots of the catalyst beds can be suppressed. The present invention is accomplished based such findings.

That is, the present invention provides a process for producing chlorine, which comprises a step of feeding hydrogen chloride and oxygen into catalyst beds which are formed in the reaction tubes of a fixed-bed multitubular reactor and which contain catalysts for use in oxidation of hydrogen chloride. This process is characterized in that the catalyst beds in the reaction tubes in one reaction zone of the fixed-bed multitubular reactor are formed by packing the reaction tubes with catalysts of a plurality of production lots, and in that the catalysts of the plurality of production lots satisfy the following condition (I):

Condition (I): a value of A/B is smaller than 1.20 (with the proviso that A and B are values of three significant figures and have a relationship of A≥B), wherein the pore volume of a catalyst of one production lot optionally selected from the plurality of production lots is A [ml/g]; and the pore volume of a catalyst of another one production lot, B [ml/g].

MODES FOR CARRYING OUT THE INVENTION

The fixed-bed multitubular reactor to be used in the process of the present invention, typically, includes a plurality of reaction tubes in a gas flowing direction, wherein the plurality of reaction tubes have reaction zones in at least parts thereof in their axial directions, and wherein the reaction zones of the reaction tubes are controlled at a constant set temperature. The temperature control of this fixed-bed multitubular reactor may be made collectively on all of the plurality of reaction tubes arranged in parallel, or may be made on each of the reaction tubes arranged in parallel, or may be made collectively on some of the plurality of reaction tubes arranged in parallel, so as to control the respective reaction tubes at set temperatures. Again, the temperature control of the fixed-bed multitubular reactor may be so made that all the regions of each reaction tube can be controlled at the same set temperature (that is, by using a single temperature-controlling means), or may be so made that a plurality of regions (reaction zones) into which each reaction tube is divided along its axial direction can be controlled at different set temperatures (that is, by using two or more temperature-controlling means).

One reaction zone of the above-described fixed-bed multitubular reactor is composed of a plurality of reaction tubes packed with catalysts.

The production lots of catalysts are production lots of catalysts produced by predetermined production methods. As a catalyst of one production lot, there are given, for example, a catalyst produced in a different batch in case of a batch process, a catalyst obtained by sectioning a continuously produced product at constant intervals in case of a continuous process, and a catalyst obtained by sectioning a continuously produced product at units of a batch step in case of a batch process in combination with a continuous process. As catalysts of a plurality of production lots, a plurality of catalysts produced as above are exemplified. Otherwise, the catalysts obtained by the above-described production processes may be mixed and homogenized for use as one lot unit.

In the present invention, preferably, catalysts which satisfy the following condition (II) are used to form catalyst beds in a reaction zone of the above-described fixed-bed multitubular reactor. By using such catalysts, it becomes possible to effectively suppress variation in temperatures of hot spots formed in the respective catalyst beds in a certain one reaction zone controlled at a constant set temperature.

Condition (II): the above-described value of A/B is smaller than 1.10 with the proviso that A and B are values of three significant figures and have a relationship of A≥B).

In this connection, the pore volume of the catalyst can be measured by a known method such as the mercury intrusion technique or the nitrogen adsorption method.

As the catalysts of the plurality of production lots for use in formation of catalyst beds in one reaction zone, catalysts of a plurality of production lots which satisfy at least one of the following conditions (III) to (IX) in addition to the above-described condition (I) or (II) are preferable. By using such catalysts, it becomes possible to more effectively suppress variation in temperatures of hot spots which occur in the plurality of reaction tubes constituting certain one reaction zone (controlled at a constant temperature).

Condition (III): a value of C/D is smaller than 1.20, preferably smaller than 1.10 (with the proviso that C and D are values of three significant figures and have a relationship of C≥D), wherein the average pore diameter of a catalyst of one production lot optionally selected from the plurality of production lots is C [nm]; and the average pore diameter of a catalyst of another one production lot, D [nm].

In this connection, the average pore diameter of the catalyst can be measured by a known method such as the mercury intrusion technique or the nitrogen adsorption method.

Condition (IV): a value of E/F is smaller than 1.20, preferably smaller than 1.10 (with the proviso that E and F are values of three significant figures and have a relationship of E≥F), wherein the specific surface area of a catalyst of one production lot optionally selected from the plurality of production lots is E [m$^2$/g]; and the specific surface area of a catalyst from another one production lot, F [m$^2$/g].

In this connection, the specific surface area of the catalyst can be measured by a known method such as the BET method (BET one-point method, BET three-point method or BET multipoint method) or the mercury intrusion technique.

Condition (V): a value of G/H is smaller than 1.10, preferably smaller than 1.05 (with the proviso that G and H are values of three significant figures and have a relationship of G≥H), wherein the content of a catalytically active component of a catalyst of one production lot optionally selected from the plurality of production lots is G [% by weight]; and the content of a catalytically active component of a catalyst of another one production lot, H [% by weight].

In this connection, the content of the catalytically active component of the catalyst can be measured by a known method such as the ICP atomic emission spectrometry or the atomic absorption spectrometry.

Condition (VI): a value of I/J is smaller than 1.2, preferably smaller than 1.1 (with the proviso that I and J are values of two significant figures and have a relationship of I≥J), wherein the average diameter of a catalyst (in the form of particles) of one production lot optionally selected from the plurality of production lots is I [mm]; and the average diameter of a catalyst of another one production lot, J [mm].

In this connection, the average diameter of the catalyst can be measured with a known means such as calipers or a digimatic indicator, and is determined as an average of the measured results of a given number of samples (usually 100 or more) optionally selected.

Condition (VII): a value of K/h is smaller than 1.20, preferably smaller than 1.10 (with the proviso that K and L are values of three significant figures and have a relationship of K≥L), wherein the apparent specific gravity of a catalyst of one production lot optionally selected from the plurality of production lots is K [g/ml]; and the apparent specific gravity of a catalyst of another one production lot, L [g/ml].

In this connection, the apparent specific gravity of the catalyst can be measured, for example, by a method of filling the catalyst in a graduated measuring cylinder, a tube with a known volume or the like.

Condition (VIII): a value of M/N is smaller than 1.2, preferably smaller than 1.1 (with the proviso that M and N are values of two significant figures and have a relationship of M≥N), wherein the particle length of a catalyst of one production lot optionally selected from the plurality of production lots is M [mm]; and the particle length of a catalyst of another one production lot, N [mm].

In this regard, the particle length of the catalyst means the largest diameter of the catalyst: for example, when a cylindrical, triangle pole-shaped, square pole-shaped, polygonal pole-shaped or ring-shaped catalyst is produced by extrusion molding, the particle length is equivalent to a length in the extruding direction.

In this connection, the particle length of the catalyst can be measured with a known means such as calipers, a digimatic indicator or the like, and is determined as an average of the measured results of a given number of samples (usually 100 or more) optionally selected.

Condition (IX): a value of O/P is smaller than 1.20, preferably smaller than 1.10 (with the proviso that O and P are values of three significant figures and have a relationship of O≥P), wherein the strength of a catalyst of one production lot optionally selected from the plurality of production lots is O [N/sample]; and the strength of a catalyst of another one production lot, P [N/sample].

The strengths of the catalysts gives considerable influence on breakage or powdering ratio of the catalysts, when the catalysts are packed in reaction tubes. By controlling the value of O/P in connection with the strengths of the catalysts, variation in differential pressure in packing can be suppressed, with the result that variation in temperatures of hot spots which occur in the reaction tubes can be suppressed.

In this connection, the strength of the catalyst can be measured with a known press type crush strength meter, a tensile strength meter or the like, and is determined as an average of the measured results of a given number of samples (usually 20 or more) optionally selected.

There is no limit in selection of a ratio of the catalysts of the plurality of production lots which satisfy the above-described condition (I) or (II) and optionally the conditions (III) to (IX), and which are packed in the plurality of the reaction tubes in the reaction zone of the fixed-bed multitubular reactor. For example, only a catalyst of one kind of production lot may be packed in one reaction tube, or a mixture of catalysts of two or more kinds of production lots may be packed in one reaction tube. Packing a mixture of catalysts of two or more kinds of production lots in one reaction tube is more effective to suppress variation in temperatures of hot spots, because this mixing averages the respective physical properties of the catalysts, different depending on each of the production lots (in pore volume, average pore diameter, specific surface area, catalytically active component content, average diameter, particle length, strength of catalyst, etc.).

Generally, the above-described catalyst bed is formed by packing a reaction tube with a content obtained by mixing a catalyst and optionally, a packing material formed by molding a material inert to an oxidation reaction of hydrogen chloride (e.g., alumina ball, etc.) and/or a carrier alone. The number of the catalyst bed(s) formed in one reaction tube may be one. However, for example, two or more catalyst beds may be continuously formed in one reaction tube which is divided into a plurality of sections along its axial direction. Further, inert material(s) may be packed in the reaction tube to form inert material bed(s) on the upper side and/or the lower side of the catalyst bed: for example, in case where two catalyst beds are continuously formed in one reaction tube along the axial direction of the tube, the above-described inert material may be formed as a partition between both the catalyst beds. However, two catalyst beds adjacent to each other are not always and definitely partitioned, and both the catalyst beds may be in direct contact with each other.

One catalyst bed in a reaction tube may contain two or more kinds of catalysts (the two kinds herein referred to are two kinds of catalysts which have different catalyst compositions from each other (different in active components and their contents), but not catalysts of two different production lots). However, preferably, only one kind of catalyst is contained in one catalyst bed. In case where two or more catalyst beds are formed in one reaction tube, it is preferable that contents to be packed in the respective catalyst beds in the one reaction tube are of the same composition or of compositions close to one another. For example, when a packing material formed by molding the above-described inert material and/or the above-described carrier alone is used in combination, it is preferable that a ratio of these materials to the catalyst is constant in each of the catalyst beds. When two or more kinds of catalysts are used in combination, it is preferable that the mixing ratio thereof is constant among each of the catalyst packed beds.

The catalyst to be used in the present invention may consist of only a catalytically active component or may be a catalytically active component supported on a carrier. There is no limit in selection of the catalytically active component in the catalyst: that is, there can be used catalysts for use in production of chlorine, which contain known catalytically active components and which have been used for production of chlorine by oxidizing hydrogen chloride with oxygen (e.g., copper catalysts, chromium catalysts, ruthenium catalysts, etc.). In concrete, examples of the copper catalysts are preferably catalysts generally called Deacon catalysts, obtained by adding various compounds as third components to copper chlorides and potassium chlorides; examples of the chromium catalysts are preferably catalysts containing chromium oxides disclosed in JP-A-61-136902, JP-A-61-275104, JP-A-62-113701, JP-A-62-270405, etc.; and examples of the ruthenium catalysts are preferably catalysts containing ruthenium oxides disclosed in JP-A-9-67103, JP-A-10-338502, JP-A-2000-281314, JP-A-2002-79093, JP-A-2002-292279, etc.

Among the above-listed catalysts, the ruthenium catalysts, particularly the catalysts containing ruthenium oxides, are preferably used in the present invention. The catalyst containing ruthenium oxide may be, for example, a catalyst essentially consisting of only ruthenium oxide, or may be a supported ruthenium oxide catalyst in which ruthenium oxide is supported on a carrier, or may be a composite oxide which comprises ruthenium oxide and other oxide such as alumina, titania, silica, zirconia, niobium oxide or the like. Among those, the catalyst comprising ruthenium oxide supported on the carrier (i.e., the supported ruthenium oxide catalyst) is more preferable, because this catalyst can exhibit high activity in spite of a small amount of ruthenium oxide contained therein. The oxidation number of ruthenium in ruthenium oxide is usually +4. While ruthenium dioxide ($RuO_2$) is generally known as the ruthenium oxide, ruthenium with other oxidation number or ruthenium oxide in other form may be contained in the catalyst.

For example, the supported ruthenium oxide catalyst is obtained by supporting a ruthenium compound on a carrier, and calcining the ruthenium compound supported on the carrier under an atmosphere of an oxygen-containing gas. As the carrier, there can be used, for example, one kind or two or more kinds of an oxide or a composite oxide of element(s) selected from aluminum, silicon, titanium, zirconium and niobium, activated carbons or the like. Among those, alumina, silica, titanium oxide and zirconium oxide are preferable. In particular, a titanium oxide having a rutile type crystalline structure is more preferable.

A weight ratio of ruthenium oxide/carrier in the supported ruthenium oxide catalyst is usually from 0.1/99.9 to 20/80, preferably from 0.5/99.5 to 15/85. The amounts of the ruthenium compound and the carrier to be used are adjusted to meet a weight ratio within this range. When the amount of the ruthenium oxide is smaller relative to this ratio, the resultant catalyst is likely to show an insufficient catalytic activity. When the amount of the ruthenium oxide is larger relative to this ratio, this is disadvantageous from the viewpoint of the cost for catalyst.

The configuration of the catalyst to be used in the present invention is not limited, and may be, for example, in the form of spherical particles, cylinders, triangle poles, square poles, polygonal columns, rings, honeycombs, granules with suitable sizes obtained by molding, pulverizing and classifying the catalyst, or the like. Among those, the catalyst molded in the form of spherical particles or cylinders is preferable. A molded body in the form of cylinders, triangle poles, square poles, polygonal columns, rings or the like is generally obtained by extrusion molding or tablet compression. In case of extrusion molding, extruded articles are fractured and/or cut into pieces with suitable lengths before use. Further, the fractured and/or cut molded bodies may be chamfered at their acute edges in fractured or cut faces with a rotary machine or the like, for such purposes as decreasing the powdering amount thereof during the use of the catalyst.

The sizes of the catalyst particles or molded bodies to be used in the present invention are not limited. However, it is hard for too large catalyst to have a sufficient activity, which is likely to lead to insufficient proceeding of a reaction. Therefore, the diameter of the catalyst is usually 5 mm or less. On the contrary, too small catalyst leads to a large pressure loss in the packed bed. Therefore, the diameter of the catalyst is preferably 1 mm or more. The diameter of the catalyst herein referred to means the diameter of spheres in case of spherical particles, the diameter of the cross sections in case of cylinders, or the largest diameter of the sections in case of other configurations.

A powdering ratio of the catalyst to be used in the present invention is preferably 0.5% by weight or less, more preferably 0.3% by weight or less. When the powdering ratio exceeds 0.5% by weight, the catalyst is subjected to powdering when packed in a reaction tube, which may lead to variation in differential packing pressure or to clogging of a piping, an apparatus or the like around the reactor. The powdering ratio herein referred to can be measured by a method described later in the part of Examples.

In the production process of the present invention, hydrogen chloride is oxidized by feeding hydrogen chloride and oxygen into the respective reaction tubes of the fixed-bed multitubular reactor. In detail, a hydrogen chloride-containing gas and an oxygen-containing gas are allowed to pass through the catalyst packed beds in the respective reaction tubes.

Examples of the hydrogen chloride-containing gas include, but not limited to, a gas generated by a reaction of hydrogen with chlorine, a gas generated by heating hydrogen chloride, and a variety of hydrogen chloride-containing gases such as a by-product gas generated by a thermal decomposition reaction or a combustion reaction of a chlorine compound, a carbonylation reaction of an organic compound with phosgene, a chlorination reaction of an organic compound with chlorine, production of chlorofluoroalkane or the like, and combustion exhaust gases from incinerators. These hydrogen chloride-containing gases may contain, as impurities, un-reacted raw materials and reaction products as a result of reactions or the like for generating the respective gases. In this case, the concentration of the impurities is preferably so adjusted that a concentration of hydrogen chloride in the gas can fall within a range described later. Again, the hydrogen chloride-containing gas may be admixed with a water vapor or an inert gas, if the concentration of hydrogen chloride in the gas can be adjusted to such that falls within the range described later. In particular, the water vapor is preferably added, because the addition of water vapor is effective to smooth a temperature distribution in the catalyst packed bed.

The above-described reactions for obtaining the hydrogen chloride-containing gases are described in detail. As the thermal decomposition reaction of the chlorine compound, there are exemplified a reaction for producing vinyl chloride from 1,2-dichloroethane, a reaction for producing tetrafluoroethylene from chlorodifluoromethane, etc. As the carbonylation reaction of the organic compound with phosgene, there are exemplified a reaction for producing isocyanate from amine, a reaction for producing carbonate ester from a hydroxy compound, etc. As the chlorination reaction of the organic compound with chlorine, there are exemplified a reaction for producing allyl chloride from propylene, a reaction for producing ethyl chloride from ethane, a reaction for producing chlorobenzene from benzene, etc. As for the production of chlorofluoroalkane, there are exemplified production of dichlorodifluoromethane and trichloromonofluoromethane by a reaction of carbon tetrachloride with hydrogen fluoride, production of dichlorodifluoromethane and trichloromonofluoromethane by a reaction of methane, chlorine and hydrogen fluoride, etc.

The concentration of hydrogen chloride in the hydrogen chloride-containing gas is usually 10% by volume or more, preferably 50% by volume or more, more preferably 80% by volume or more. When the concentration of hydrogen chloride is too low, a production efficiency tends to lower, and the operation of separating produced chlorine and recycling un-reacted oxygen may become complicated.

The above-described oxygen-containing gas may be an air or pure oxygen. The pure oxygen can be obtained by a conventional industrial method such as a pressure swing method or cryogenic separation of an air.

In the production process of the present invention, the rate of feeding hydrogen chloride (i.e., the hydrogen chloride-containing gas) is usually from about 10 to about 20,000 $h^{-1}$ in terms of a gas-feeding rate (L/h) per 1 L of a catalyst (reduced under conditions of 0° C. and 1 normal atmosphere), i.e., in terms of GHSV. On the other hand, the rate of feeding the oxygen-containing gas is usually from about 10 to about 20,000 $h^{-1}$ in terms of a gas-feeding rate (L/h) per 1 L of a catalyst (reduced under conditions of 0° C. and 1 normal atmosphere), i.e., in terms of GHSV.

In the production process of the present invention, a ratio of oxygen (the oxygen-containing gas) to hydrogen chloride (the hydrogen chloride-containing gas) is theoretically needed to be ¼ mole of oxygen to one mole of hydrogen chloride, in order to perfectly oxidize hydrogen chloride to thereby obtain chlorine. However, the amount of oxygen generally used is 0.1 to 10 times larger than this theoretical amount.

In the production process of the present invention, a superficial linear velocity of the gas in the fixed-bed multitubular reactor is set to preferably from 0.50 to 10 m/s, more preferably from 0.70 to 6 m/s, still more preferably from 0.70 to 3 m/s. When this gas linear velocity is lower than 0.50 m/s, removal of reaction heat becomes insufficient, with the result that it may become difficult to obtain the effect of the present invention. When this gas linear velocity exceeds 10 m/s, a differential packing pressure becomes too high, which may make it difficult to operate the reactor. In this regard, the superficial linear velocity of the gas in the fixed-bed multitubular reactor means a ratio between a total of feeding velocities of all the gases in a standard state reduced under conditions of 0° C. and 1 normal atmosphere) fed to the reactor, and the sectional area of the reactor.

In the production process of the present invention, the conditions for the reaction are not limited. However, the oxidation reaction of hydrogen chloride is preferably carried out at a relatively low temperature, because this reaction is an equilibrium reaction and because an equilibrium conversion tends to decrease when the reaction is carried out at too high a temperature. Thus, the reaction temperature is usually from 100 to 500° C., preferably from 200 to 450° C., and the reaction pressure is usually from about 0.1 to about 5 MPa.

EXAMPLES

Hereinafter, the present invention will be illustrated by way of Examples thereof, which however should not be construed as limiting the scope of the present invention in any way. The physical properties of the catalysts herein used were measured by the following methods.

<Pore Volume>

A catalyst to be measured, weighing 0.6 to 1.2 g, was dried at 110° C. in a drier for 4 hours, and the weight of the dried catalyst was precisely measured for use as a sample. This sample was set in the cell of a pore volume-measuring apparatus ("Autopore III9420" manufactured by MICROMERITICS), and the inner pressure of the cell was reduced to 50 μmHg or lower, and then, the cell was filled with mercury. Then, a pressure applied to the cell was gradually increased, and an amount of mercury injected under each pressure was measured, provided that a waiting time for equilibrium of the injected mercury was set at 10 seconds. Then, the sum of the amounts (ml) of mercury injected while the pressure applied was increased from 0.007 to 207 MPa was divided by the weight (g) of the sample to thereby determine an amount of injected mercury per 1 g of the sample. This value was defined as a pore volume (ml/g).

<Average Pore Diameter>

An average pore diameter was calculated from the results of the amount of mercury injected under each pressure applied, obtained in the above-described measurement of the pore volume. Firstly, a pore diameter d under each pressure P was calculated from the amount of mercury injected under each pressure P, according to the following equation of Washburn:

Pore diameter $d$ (nm)=$(-4\gamma \cos \theta/P) \times 10^3$

P: a pressure (MPa)
γ: a surface tension of mercury ($482 \times 1^{-3}$ N/m)
θ: a contact angle of mercury (140 deg.).

Then, a surface area Sr of a pore under each pressure P was calculated from the pore diameter d under each pressure P and the amount of mercury injected under each pressure P. Then, a cumulative pore surface area S ($nm^2$/g) was found by dividing a cumulative value ($nm^2$) of the surface areas Sr of the pore under the respective pressures P of from 0.007 to 207 MPa, by the weight (g) of the sample; and a cumulative pore volume V ($nm^3$/g) was found by dividing a cumulative value ($nm^3$) of the pore volumes under the respective pressures of from 0.007 to 207 MPa (i.e., a total of the amounts of mercury injected under the respective pressures of from 0.007 to 207 MPa) by the weight (g) of the sample. Then, an average pore diameter was calculated from the cumulative pore surface area S and the cumulative pore volume V according to the following equation:

Average pore diameter (nm)=$4V/S$

<Specific Surface Area>

A catalyst to be measured, weighing 1 to 2 g, was dried at 110° C. under a nitrogen atmosphere for 1.5 hours, and the weight of the dried catalyst was precisely measured for use as a sample. The specific surface area ($m^2$/g) of this sample was determined by the BET one-point method, using a specific surface area-measuring instrument ("SA-1100" manufactured by SIBATA SCIENTIFIC TECHNOLOGY LTD.).

<Ruthenium Content (or Support Ratio)>

A catalyst to be measured was dissolved in sodium peroxide, and a constant volume of the resulting solution was taken and was then subjected to the ICP-AES to measure a ruthenium content thereof. This measurement was conducted twice, and the respective found values (% by weight) were calculated to three places of decimals, and an average of the two found values was expressed to two places of decimals in accordance with the rounding of numerical values regulated in JIS-Z8401.

<Average Diameter>

The diameters of the sections of 100 or more catalysts optionally selected were measured with a digital caliper, and an average (mm) thereof was calculated.

<Apparent Specific Gravity>

A catalyst to be measured, weighing about 400 g, was used as a sample. The entire amount of the sample was dropped onto the center portion of a 1-L, measuring cylinder in 45 to 60 seconds, from a funnel set on the measuring cylinder. After that, the funnel was removed, and the measuring cylinder was tapped 20 times from a height of 1 to 2 cm, while being tilted about 10 degrees on a rubber mat (3 mm in thickness and 60 HS in hardness). Then, the catalyst in the measuring cylinder was leveled at their top portion to read the volume of the catalyst. The weight (g) of the sample was divided by this read value of the volume (ml) to find an apparent specific gravity (g/ml).

<Average Particle Length>

One hundred or more catalyst particles optionally selected were measured at their lengths in directions vertical to the sections thereof as particle lengths with a digital caliper, and an average (mm) thereof was calculated.

<Strength of Catalyst>

Twenty or more catalyst particles with particle lengths of 4.5 mm or more (i.e., lengths in directions vertical to the sections of the catalyst particles) were selected and were then laid on the center of the sample table of a digital Kiya hardness tester ("KHT20N" manufactured by Fujiwara Scientific Company) so that the directions vertical to the sections of the catalyst particles could be in parallel to the surface of the sample table. After that, the hardness (N) of the respective catalyst particles was measured. Then, the sum of the measured values of hardness was divided by the number of the measured catalyst particles to find an average (N/sample) of the strengths of the particles.

<Powdering Ratio>

A catalyst to be measured, weighing about 200 g, was used as a sample ((x) in weight), and the sample was entirely dropped in 20 to 40 seconds, into a metallic tube (18 mm in inner diameter and 4,000 mm in entire length) from the top of the tube, wherein the metallic tube was so secured on a metallic vat that its longitudinal direction could be vertical to the metallic vat with a 50 mm spatial interval therebetween. All of the sample falling from the lower side of the tube was collected in the metallic vat and were then screened through a sieve with a sieve opening of 0.85 mm. Then, the weight of the sample which had passed through the sieve was measured (this weight being (y)). Then, a powdering ratio (% by weight) was calculated by the following equation:

Powdering ratio (% by weight)=$(y/x) \times 100$.

<Catalytic Activity (Conversion of Hydrogen Chloride)>

A catalyst (1.0 g) to be measured was diluted with α-alumina balls with diameters of 2 mm ("SSA995" manufactured by NIKKATO CORPORATION) (12 g). This dilution was then packed in a nickel reaction tube (14 mm in inner diameter); and α-alumina balls (12 g) of the same kind were packed in the gas inlet side of this reaction tube as a preheating bed. A hydrogen chloride gas (hydrogen chloride concentration: 99.999% by volume) and an oxygen gas (pure oxygen) were fed into this reaction tube at rates of 0.214 mol/hr. for the hydrogen chloride gas (reduced to 4.8 L/hr. under conditions of 0° C. and one normal atmosphere) and 0.107 mol/hr. for the oxygen gas (reduced to 2.4 L/hr. under conditions of 0° C. and one normal atmosphere), respectively, under an atmospheric pressure. Then, the reaction tube (or the catalyst packed bed) was heated to a temperature of from 282 to 283° C. for a reaction. At a point of time when 1.5 hours had passed since the start of the reaction, a gas outgoing from the outlet of the reaction tube was allowed to pass through an aqueous solution of 30% potassium iodide for 20 minutes for sampling. This sampled gas was subjected to iodine titration to measure an amount of produced chlorine and to find a production rate of chlorine (mol/hr.). Then, a conversion of hydrogen chloride (i.e., a catalytic activity) was calculated from this chlorine production rate and the above-described hydrogen chloride-feeding rate (mol/hr.), according to the following equation:

Conversion (%) of hydrogen chloride=[chlorine production rate (mol/hr.)×2÷hydrogen chloride-feeding rate (mol/hr.)]×100.

Referential Example 1

Preparation of Catalyst a

Titanium oxide ("STR-60R" with a 100% rutyl type structure, manufactured by Sakai Chemical Industry Co., Ltd.) (34 parts by weight), α-alumina ("AES-12" manufactured by Sumitomo Chemical Company, Limited) (66 parts by weight) and a methyl cellulose-based binder (2.5 parts by weight) were mixed. Then, a titania oxide sol ("CSB" manufactured by Sakai Chemical Industry Co., Ltd.; titania content: 38% by weight) (13.2 parts by weight) and pure water (22.5 parts by weight) were added and kneaded into the above mixture. This knead mixture was subjected to extrusion molding to obtain cylindrical molded bodies with diameters of 3.0 mm, which were then dried and fractured into pieces with lengths of about 4 to about 6 mm. The fractured molded bodies were calcined at a temperature of from 750 to 800° C. in an air for 3 hours, to obtain a carrier comprising titanium oxide and α-alumina. Next, the carrier was impregnated with an aqueous solution of ruthenium chloride, and was then dried and calcined at 250° C. in an air for 2 hours, to obtain a blue-gray supported ruthenium oxide catalyst having 1.53% by weight of ruthenium oxide supported thereon (Catalyst a).

The physical properties of this Catalyst a are shown in Table 1.

Referential Example 2

Preparation of Catalyst b

The operation of Referential Example 1 was repeated to obtain a blue-gray supported ruthenium oxide catalyst having 1.54% by weight of ruthenium oxide supported thereon (Catalyst b).

The physical properties of this Catalyst b are shown in Table 1.

Referential Example 3

Preparation of Catalyst c

Titanium oxide ("STR-60R" with a 100% rutyl type structure, manufactured by Sakai Chemical Industry Co., Ltd.) (34 parts by weight), α-alumina ("AES-12" manufactured by Sumitomo Chemical Company, Limited) (66 parts by weight) and a methyl cellulose-based binder (2.0 parts by weight) different from the binder used in Referential Example 1 were mixed. Then, a titania oxide sol ("CSB" manufactured by Sakai Chemical Industry Co., Ltd.; titania content: 38% by weight) (13.2 parts by weight) and pure water (19.0 parts by weight) were added and kneaded into the above mixture. This knead mixture was subjected to extrusion molding to obtain cylindrical molded bodies with diameters of 3.0 mmφ, which were then dried and fractured into pieces with lengths of about 4 to about 6 mm. The fractured molded bodies were calcined at a temperature of from 750 to 800° C. in an air for 3 hours, to obtain a carrier comprising titanium oxide and α-alumina. Next, the carrier was impregnated with an aqueous solution of ruthenium chloride, and was then dried and calcined at 250° C. in an air for 2 hours, to obtain a blue-gray supported ruthenium oxide catalyst having 1.52% by weight of ruthenium oxide supported thereon (Catalyst c).

The physical properties of this Catalyst c are shown in Table 1.

TABLE 1

| | | Catalyst a | Catalyst b | Catalyst c |
|---|---|---|---|---|
| Pore volume | [ml/g] | $2.24 \times 10^{-1}$ | $2.21 \times 10^{-1}$ | $1.82 \times 10^{-1}$ |
| Average pore diameter | [nm] | $7.14 \times 10^{1}$ | $7.16 \times 10^{1}$ | $5.98 \times 10^{1}$ |
| Specific surface area | [m$^2$/g] | $1.55 \times 10^{1}$ | $1.58 \times 10^{1}$ | $1.44 \times 10^{1}$ |
| Support Ratio of ruthenium | [wt. %] | 1.53 | 1.54 | 1.52 |
| Average diameter | [mm] | 3.2 | 3.2 | 3.0 |
| Apparent specific gravity | [g/ml] | 1.33 | 1.35 | 1.38 |
| Average particle length | [mm] | 5.2 | 5.0 | 5.4 |
| Catalyst strength | [N/sample] | $5.39 \times 10^{1}$ | $5.19 \times 10^{1}$ | $4.80 \times 10^{1}$ |
| Powdering ratio | [wt. %] | 0.2 | 0.2 | 0.1 |
| Catalytic activity (Conversion of hydrogen chloride) | [%] | 9.65 | 9.61 | 8.42 |

Example 1

There was used a fixed-bed multitubular reactor which had 2 nickel-made reaction tubes (14 mm in inner diameter) controlled in temperature by a single temperature-controlling means (i.e., a reactor having 2 reaction tubes covered with a single jacket in which a heating medium was allowed to flow). One reaction tube was packed with Catalyst a, and the other reaction tube, with Catalyst b, to lengths of packed catalysts of 2.6 cm, to thereby form catalyst packed beds in the reaction tubes, respectively. The respective reaction tubes were purged by nitrogen gases, and the jacket was set at 345° C. After that, feeding of the nitrogen gases was stopped. Then, a hydrogen chloride gas (the concentration of hydrogen chloride: 99.999% by volume) and an oxygen gas (pure oxygen) were fed to the respective reaction tubes at rates of 0.670 mol/hr. for the hydrogen chloride gas (reduced to 15.0 L/hr. under conditions of 0° C. and one normal atmosphere) and 0.335 mol/hr. for the oxygen gas (reduced to 7.5 L/hr. under conditions of 0° C. and one normal atmosphere), respectively, under an atmospheric pressure, so as to oxidize hydrogen chloride.

The temperatures of Catalysts a and b packed in the respective reaction tubes were monitored immediately after the start of the oxidation reaction. The highest temperatures of the catalysts found within one hour after the start of the reaction (highest temperature of catalyst) are shown in Table 2, together with the weights of the catalysts packed in the respective reaction tubes (weight of packed catalyst).

At a point of time when one hour had passed since the start of the reaction, the gases from the outlets of the respective reaction tubes were collected, and this gas mixture was allowed to pass through an aqueous solution of 30% potassium iodide for 5 mins. for sampling. This sample was subjected to iodine titration to measure an amount of produced chlorine and to find a production rate of chlorine (mol/hr.). A conversion (%) of hydrogen chloride was calculated from this production rate of chlorine and the above-described hydrogen chloride-feeding rate (mol/hr.), according to the following equation:

Conversion (%) of hydrogen chloride=[production rate of chlorine (mol/hr.)×2 hydrogen chloride-feeding rate (mol/hr.)]×100.

The results are shown in Table 2.

TABLE 2

|  |  | Catalyst a | Catalyst b |
| --- | --- | --- | --- |
| Weight of packed catalyst | [g] | 5.50 | 5.51 |
| Highest temperature of catalyst | [° C.] | 365 | 363 |
| Addition rate of hydrogen chloride | [%] |  | 70.2 |

Comparative Example 1

Hydrogen chloride was oxidized by repeating the operation of Example 1 except for the use of Catalyst instead of Catalyst b. The temperatures of Catalysts a and a packed in the respective reaction tubes were monitored immediately after the start of the oxidation reaction, as well as Example 1. The highest temperatures of the catalysts found within one hour after the start of the reaction (highest temperature of catalyst) are shown in Table 3, together with the weights of the catalysts packed in the respective reaction tubes (weight of packed catalyst). At a point of time when one hour had passed since the start of the reaction, the gases from the outlets of the respective reaction tubes were collected for sampling, and a conversion (%) of hydrogen chloride was calculated from this sample, as well as Example 1. The results are shown in Table 3.

TABLE 3

|  |  | Catalyst a | Catalyst c |
| --- | --- | --- | --- |
| Weight of packed catalyst | [g] | 5.50 | 6.00 |
| Highest temperature of catalyst | [° C.] | 365 | 357 |
| Addition rate of hydrogen chloride | [%] |  | 69.2 |

The following are apparent from the results of Tables 2 and 3. In Comparative Example 1 in which the ratio of the pore volumes of the catalysts used, i.e., the value of Catalyst a (the pore volume: $2.24 \times 10^{-1}$ ml/g)/Catalyst c (the pore volume: $1.82 \times 10^{-1}$ ml/g) was 1.23, a difference between each of the highest temperatures of Catalysts a and c during the oxidation reaction of hydrogen chloride was so large as 8° C. In contrast, in Example 1 in which the ratio of the pore volumes of the catalysts used, i.e., the value of Catalyst a (the pore volume: $2.24 \times 10^{-1}$ ml/g)/Catalyst b (the pore volume: $2.21 \times 10^{-1}$ ml/g) was 1.01, a difference between each of the highest temperatures of Catalysts a and b during the oxidation reaction of hydrogen chloride was as small as 2° C. In other words, it is apparent that variation in temperatures of hot spots in the respective reaction tubes can be decreased by selecting catalysts for use in the respective reaction tubes so that a ratio of the pore volumes of the catalysts can be a smaller value.

Referential Example 4

Preparation of Catalyst d

Titanium oxide ("STR-60R" with a 100% rutyl type structure, manufactured by Sakai Chemical Industry Co., Ltd.) (34 parts by weight), α-alumina ("AES-12" manufactured by Sumitomo Chemical Company, Limited) (66 parts by weight) and a methyl cellulose-based binder (2.0 parts by weight) different from any of the binders used in Referential Examples 1 and 3 were mixed. Then, a titania oxide sol ("CSB" manufactured by Sakai Chemical Industry Co., Ltd.; titania content: 38% by weight) (13.2 parts by weight) and pure water (22.0 parts by weight) were added and kneaded into the above mixture. This knead mixture was subjected to extrusion molding to obtain cylindrical molded bodies with diameters of 1.5 mmϕ, which were then dried and fractured into pieces with lengths of about 2 to about 4 mm. The fractured molded bodies were calcined at a temperature of from 750 to 800° C. in an air for 3 hours, to obtain a carrier comprising titanium oxide and α-alumina. Next, the carrier was impregnated with an aqueous solution of ruthenium chloride, and was then dried and calcined at 250° C. in an air for 2 hours, to obtain a blue-gray supported ruthenium oxide catalyst having 1.50% by weight of ruthenium oxide supported thereon (Catalyst d). The physical properties of this Catalyst d are shown in Table 4.

Referential Example 5

Preparation of Catalyst e

The operation of Referential Example 4 was repeated to obtain a blue-gray supported ruthenium oxide catalyst having 1.55% by weight of ruthenium oxide supported thereon (Catalyst e). The physical properties of this Catalyst e are shown in Table 4.

Referential Example 6

Preparation of Catalyst f

Titanium oxide ("STR-60R" with a 100% rutyl type structure, manufactured by Sakai Chemical Industry Co., Ltd.) (34 parts by weight), α-alumina ("AES-12" manufactured by Sumitomo Chemical Company, Limited) (66 parts by weight) and a methyl cellulose-based binder (2.0 parts by weight) which was the same one as the binder used in Referential Example 3 were mixed. Then, a titania oxide sol ("CSB" manufactured by Sakai Chemical Industry Co., Ltd.; titania content: 38% by weight) (13.2 parts by weight) and pure water (29.0 parts by weight) were added and kneaded into the above mixture. This knead mixture was subjected to extrusion molding to obtain cylindrical molded bodies with diameters of 1.5 mm, which were then dried and fractured into pieces with lengths of about 4 to about 6 mm. The fractured molded bodies were calcined at a temperature of from 600 to 650° C. in an air for 3 hours, to obtain a carrier comprising titanium oxide and α-alumina. Next, the carrier was impregnated with an aqueous solution of ruthenium chloride, and was then dried and calcined at 250° C. in an air for 2 hours, to obtain a blue-gray supported ruthenium oxide catalyst having 1.52% by weight of ruthenium oxide supported thereon (Catalyst f). The physical properties of this Catalyst f are shown in Table 4.

TABLE 4

|  |  | Catalyst d | Catalyst e | Catalyst f |
| --- | --- | --- | --- | --- |
| Pore volume | [ml/g] | $2.06 \times 10^{-1}$ | $2.04 \times 10^{-1}$ | $2.74 \times 10^{-1}$ |
| Specific surface area | [m$^2$/g] | $1.45 \times 10^1$ | $1.48 \times 10^1$ | $1.79 \times 10^1$ |
| Support Ratio of ruthenium | [wt. %] | 1.50 | 1.55 | 1.52 |
| Average diameter | [mm] | 1.4 | 1.5 | 1.5 |
| Apparent specific gravity | [g/ml] | 1.42 | 1.42 | 1.20 |
| Average particle length | [mm] | 3.0 | 3.0 | 2.7 |
| Catalyst strength | [N/sample] | $3.67 \times 10^1$ | $3.53 \times 10^1$ | $1.76 \times 10^1$ |
| Powdering ratio | [wt. %] | 0.2 | 0.2 | 0.3 |
| Catalytic activity (Conversion of hydrogen chloride) | [%] | 11.2 | 10.9 | 14.1 |

Example 2

Hydrogen chloride was oxidized by repeating the operation of Example 1, except for the use of Catalyst d instead of Catalyst a, the use of Catalyst e instead of Catalyst b, and formation of the respective catalyst packed beds with lengths of packed catalysts of 11.0 cm. The temperatures of Catalysts d and e packed in the respective reaction tubes were monitored immediately after the start of the oxidation reaction, as well as Example 1. The highest temperatures of the catalysts found within one hour after the start of the reaction (highest temperature of catalyst) are shown in Table 5, together with the weights of the catalysts packed in the respective reaction tubes (weight of packed catalyst). At a point of time when one hour had passed since the start of the reaction, the gases from the outlets of the respective reaction tubes were collected for sampling, and a conversion (%) of hydrogen chloride was calculated from this sample, as well as Example 1 The results are shown in Table 5.

TABLE 5

|  |  | Catalyst d | Catalyst e |
|---|---|---|---|
| Weight of packed catalyst | [g] | 19.18 | 19.19 |
| Highest temperature of catalyst | [° C.] | 374 | 376 |
| Addition rate of hydrogen chloride | [%] | 89.4 | |

Comparative Example 2

Hydrogen chloride was oxidized by repeating the operation of Example 1, except for the use of Catalyst d instead of Catalyst a, the use of Catalyst f instead of Catalyst b, and formation of the respective catalyst packed beds with lengths of packed catalysts of 11.0 cm. The temperatures of Catalysts d and f packed in the respective reaction tubes were monitored immediately after the start of the oxidation reaction, as well as Example 1. The highest temperatures of the catalysts found within one hour after the start of the reaction (highest temperature of catalyst) are shown in Table 6, together with the weights of the catalysts packed in the respective reaction tubes (weight of packed catalyst). At a point of time when one hour had passed since the start of the reaction, the gases from the outlets of the respective reaction tubes were collected for sampling, and a conversion (%) of hydrogen chloride was calculated from this sample, as well as Example 1. The results are shown in Table 6.

TABLE 6

|  |  | Catalyst d | Catalyst f |
|---|---|---|---|
| Weight of packed catalyst | [g] | 19.18 | 15.00 |
| Highest temperature of catalyst | [° C.] | 374 | 385 |
| Addition rate of hydrogen chloride | [%] | 87.7 | |

The following are apparent from the results of Tables 5 and 6. In Comparative Example 2 in which the ratio of the pore volumes of the catalysts used, i.e., the value of Catalyst f (the pore volume: $2.74 \times 10^{-1}$ ml/g)/Catalyst d (the pore volume: $2.06 \times 10^{-1}$ ml/g) was 1.33, a difference between each of the highest temperatures of Catalysts d and f during the oxidation reaction of hydrogen chloride was so large as 11° C. In contrast, in Example 2 in which the ratio of the pore volumes of the catalysts used, i.e., the value of Catalyst d (the pore volume: $2.06 \times 10^{-1}$ ml/g)/Catalyst e (the pore volume: $2.04 \times 10^{-1}$ ml/g) was 1.01, a difference between each of the highest temperatures of Catalysts d and e during the oxidation reaction of hydrogen chloride was as small as 2° C. In other words, it is apparent that variation in temperatures of hot spots in the respective reaction tubes can be suppressed by selecting catalysts for use in the respective reaction tubes so that a ratio of the pore volumes of the catalysts can be a smaller value.

INDUSTRIAL APPLICABILITY

Chlorine can be selectively produced at a higher efficiency.

The invention claimed is:

1. A process for producing chlorine by feeding hydrogen chloride and oxygen into catalyst beds which are formed in the reaction tubes of a fixed-bed multitubular reactor and which contain catalysts of a plurality of production lots for use in oxidation of hydrogen chloride, characterized in that
   the catalyst beds in one reaction zone in the fixed-bed multitubular reactor are formed by packing catalysts of the plurality of production lots, wherein the pore volume of a first catalyst of one production lot selected from the plurality of production lots is A [ml/g] and the specific surface area of the first catalyst is E [m²/g], and the pore volume of a second catalyst of another one production lot is B [ml/g] and the specific surface area of the second catalyst is F [m²/g]; and
in that
   the catalysts of the plurality of production lots satisfy a condition (I) wherein a value of A/B is smaller than 1.20 with the proviso that A and B are values of three significant figures, having a relationship of A≥B, and
   in addition to satisfying the condition (I), the catalysts of the plurality of production lots satisfy a condition (IV) wherein a value of E/F is smaller than 1.20, with the proviso that E and F are values of three significant figures and have a relationship of E≥F.

2. The process of claim 1, wherein the value of A/B is smaller than 1.10 with the proviso that A and B are values of three significant figures, having a relationship of A≥B.

3. The process of claim 1, wherein the catalysts are supported ruthenium oxide catalysts.

4. The process of claim 1, wherein the catalysts are molded articles in the form of spherical particles or cylinders.

5. The process of claim 1, wherein A >B.

6. The process of claim 1, wherein, in addition to satisfying the condition (I) and the condition (IV), the catalysts of the plurality of production lots satisfy one or more of the following conditions (III), (V), (VI), (VII), (VIII) and (IX):
   (III) a value of C/D is smaller than 1.20, with the proviso that C and D are values of three significant figures and have a relationship of C≥D, wherein the average pore diameter of the first catalyst is C [nm], and the average pore diameter of the second catalyst is D [nm];
   (V) a value of G/H is smaller than 1.10, with the proviso that G and H are values of three significant figures and have a relationship of G≥H, wherein the content of a catalytically active component of the first catalyst is G [% by weight], and the content of a catalytically active component of the second catalyst is H [% by weight];
   (VI) a value of I/J is smaller than 1.2, with the proviso that I and J are values of two significant figures and have a relationship of I≥J, wherein the average diameter of the first catalyst is I [mm], and the average diameter of the second catalyst is J [mm];

(VII) a value of K/L is smaller than 1.20, with the proviso that K and L are values of three significant figures and have a relationship of K≥L, wherein the apparent specific gravity of the first catalyst is K [g/ml], and the apparent specific gravity of the second catalyst is L [g/ml];

(VIII) a value of M/N is smaller than 1.2, with the proviso that M and N are values of two significant figures and have a relationship of M≥N, wherein the particle length of the first catalyst is M [mm], and the particle length of the second catalyst is N [mm];

(IX) a value of O/P is smaller than 1.20, with the proviso that O and P are values of three significant figures and have a relationship of O≥P, wherein the strength of the first catalyst is O [N/sample], and the strength of the second catalyst is P [N/sample].

7. The process of claim 6, wherein the catalysts of the plurality of production lots satisfy two or more of the conditions (III), (V), (VI), (VII), (VIII) and (IX).

8. The process of claim 1, wherein, in addition to satisfying the condition (I) and the condition (IV), the catalysts of the plurality of production lots satisfy the following condition (V):

(V) a value of G/H is smaller than 1.10, with the proviso that G and H are values of three significant figures and have a relationship of G≥H, wherein the content of a catalytically active component of the first catalyst is G [% by weight], and the content of a catalytically active component of the second catalyst is H [% by weight].

9. The process of claim 1, wherein, in addition to satisfying the condition (I) and the condition (IV), the catalysts of the plurality of production lots satisfy the following condition (VII):

(VII) a value of K/L is smaller than 1.20, with the proviso that K and L are values of three significant figures and have a relationship of K≥L, wherein the apparent specific gravity of the first catalyst is K [g/ml], and the apparent specific gravity of the second catalyst is L [g/ml].

10. A process for controlling variation of temperature within a fixed-bed multitubular reactor during a process of producing chlorine by feeding hydrogen chloride and oxygen into catalyst beds in reaction tubes of the fixed-bed multitubular reactor, comprising:
  selecting a first catalyst lot from a plurality of catalyst production lots for use in oxidation of hydrogen chloride, wherein the pore volume of the first catalyst lot is A [ml/g];
  selecting a second catalyst lot from the plurality of catalyst production lots for use in oxidation of hydrogen chloride, wherein the pore volume of the second catalyst lot is B [ml/g]; and
  packing the catalyst beds in a reaction zone of the fixed-bed multitubular reactor with the selected catalysts of the first catalyst lot and the second catalyst lot,
  wherein the catalysts of the first catalyst lot and the second catalyst lot are selected so as to satisfy the following condition (I):
  (I) a value of A/B is smaller than 1.20, with the proviso that A and B are values of three significant figures, having a relationship of A≥B.

11. The process of claim 10, wherein the value of A/B is smaller than 1.10.

12. The process of claim 10, wherein the catalysts are supported ruthenium oxide catalysts.

13. The process of claim 10, wherein the catalysts are molded articles in the form of spherical particles or cylinders.

14. The process of claim 10, wherein A >B.

15. The process of claim 10, wherein, in addition to satisfying the condition (I), the catalysts of the first catalyst lot and the second catalyst lot are selected so as to satisfy one or more of the following conditions (III) to (IX):

(III) a value of C/D is smaller than 1.20, with the proviso that C and D are values of three significant figures and have a relationship of C≥D, wherein the average pore diameter of the first catalyst lot is C [nm], and the average pore diameter of the second catalyst lot is D [nm];

(IV) a value of E/F is smaller than 1.20, with the proviso that E and F are values of three significant figures and have a relationship of E≥F, wherein the specific surface area of the first catalyst lot is E [m$^2$/g], and the specific surface area of the second catalyst lot is F [m$^2$/g];

(V) a value of G/H is smaller than 1.10, with the proviso that G and H are values of three significant figures and have a relationship of G≥H, wherein the content of a catalytically active component of the first catalyst lot is G [% by weight], and the content of a catalytically active component of the second catalyst lot is H [% by weight];

(VI) a value of I/J is smaller than 1.2, with the proviso that I and J are values of two significant figures and have a relationship of I≥J, wherein the average diameter of the first catalyst lot is I [mm], and the average diameter of the second catalyst lot is J [mm];

(VII) a value of K/L is smaller than 1.20, with the proviso that K and L are values of three significant figures and have a relationship of K≥L, wherein the apparent specific gravity of the first catalyst lot is K [g/ml], and the apparent specific gravity of the second catalyst lot is L [g/ml];

(VIII) a value of M/N is smaller than 1.2, with the proviso that M and N are values of two significant figures and have a relationship of M≥N, wherein the particle length of the first catalyst lot is M [mm], and the particle length of the second catalyst lot is N [mm];

(IX) a value of O/P is smaller than 1.20, with the proviso that O and P are values of three significant figures and have a relationship of O≥P, wherein the strength of the first catalyst lot is O [N/sample], and the strength of the second catalyst is lot P [N/sample].

16. The process of claim 15, wherein the catalysts of the first catalyst lot and the second catalyst lot are selected so as to satisfy two or more of the conditions (III) to (IX).

17. The process of claim 10, wherein, in addition to satisfying the condition (I), the catalysts of the first catalyst lot and the second catalyst lot are selected so as to satisfy the following condition (V):

(V) a value of G/H is smaller than 1.10, with the proviso that G and H are values of three significant figures and have a relationship of G≥H, wherein the content of a catalytically active component of the first catalyst lot is G [% by weight], and the content of a catalytically active component of the second catalyst lot is H [% by weight].

18. The process of claim 10, wherein, in addition to satisfying the condition (I), the catalysts of the plurality of the first catalyst lot and the second catalyst lot are selected so as to satisfy the following condition (VII):

(VII) a value of K/L is smaller than 1.20, with the proviso that K and L are values of three significant figures and have a relationship of K≥L, wherein the apparent specific gravity of the first catalyst lot is K [g/ml], and the apparent specific gravity of the second catalyst lot is L [g/ml].

19. The process of claim 10, wherein, in addition to satisfying the condition (I), the catalysts of the first catalyst lot and the second catalyst lot are selected so as to satisfy the following condition (IV):

(IV) a value of E/F is smaller than 1.20, with the proviso that E and F are values of three significant figures and have a relationship of E≥F, wherein the specific surface area of the first catalyst lot is E [m²/g], and the specific surface area of the second catalyst lot is F [m²/g].

20. The process of claim 10, wherein the reaction zones of the reaction tubes are controlled at a constant set temperature.

* * * * *